(12) United States Patent
Xiao et al.

(10) Patent No.: US 12,467,437 B2
(45) Date of Patent: Nov. 11, 2025

(54) SILK FIBROIN-BASED MULTI-RESPONSIVE SOFT ACTUATOR, MANUFACTURING METHOD AND REGULATION AND CONTROL METHOD

(71) Applicant: ZHEJIANG LAB, Zhejiang (CN)

(72) Inventors: Jianliang Xiao, Zhejiang (CN); Haitao Liu, Zhejiang (CN); Lei Zhang, Zhejiang (CN); Shan Wang, Zhejiang (CN)

(73) Assignee: ZHEJIANG LAB, Zhejiang (CN)

( * ) Notice: Subject to any disclaimer, the term of this patent is extended or adjusted under 35 U.S.C. 154(b) by 0 days.

(21) Appl. No.: 19/074,449

(22) Filed: Mar. 10, 2025

(65) Prior Publication Data

US 2025/0207566 A1    Jun. 26, 2025

Related U.S. Application Data

(63) Continuation of application No. PCT/CN2023/104855, filed on Jun. 30, 2023.

(30) Foreign Application Priority Data

May 6, 2023   (CN) .......................... 202310501676.8

(51) Int. Cl.
  *F03G 7/06*   (2006.01)
(52) U.S. Cl.
  CPC ........ *F03G 7/0618* (2021.08); *F03G 7/06112* (2021.08); *F05B 2280/4011* (2013.01); *F05B 2280/5002* (2013.01)

(58) Field of Classification Search
  CPC .............. F03G 7/0618; F03G 7/06112; F05B 2280/4011; F05B 2280/5002; A61F 2002/5066
  See application file for complete search history.

(56) References Cited

FOREIGN PATENT DOCUMENTS

| CN | 108467508 | 8/2018 |
|---|---|---|
| CN | 111189565 | 5/2020 |
| WO | 2020181790 | 9/2020 |

OTHER PUBLICATIONS

Spider-inspired regenerated silk fibroin actuator via microfluidic spinning, Chemical Engineering Journal, Wu et al (Year: 2022).*

(Continued)

*Primary Examiner* — Bruce E Snow
(74) *Attorney, Agent, or Firm* — JCIPRNET

(57) ABSTRACT

A silk fibroin-based multi-responsive soft actuator and a manufacturing method therefor are provided. The soft actuator includes a silk fibroin membrane and a flexible substrate, the silk fibroin membrane being arranged on and tightly bonded with the flexible substrate to form a double-layer membrane structure, thermal expansion coefficients of the silk fibroin membrane and the flexible substrate being different. The manufacturing method for a soft actuator includes: performing plasma processing on a flexible substrate; then scrap-coating the flexible substrate with a silk fibroin wet membrane, drying same to obtain a silk fibroin membrane, the silk fibroin membrane together with the flexible substrate forming a double-layer membrane; soaking the double-layer membrane into water, and then drying same; and integrally or locally soaking in a calcium chloride aqueous solution the silk fibroin membrane in the dried double-layer membrane, then taking out same, and drying same to obtain a soft actuator.

1 Claim, 3 Drawing Sheets

(56) References Cited

OTHER PUBLICATIONS

Multi-stimuli responsive and reversible soft actuator engineered by layered fibrous matrix and hydrogel micropatterns, Cho et al. (Year: 2022).*

Jianliang Xiao et al., "Reprogrammable Multi-Responsiveness of Regenerated Silk for Versatile Soft Actuators", Advanced Functional Materials, Apr. 9, 2024, pp. 1-10, vol. 34, Issue 32.

Haitao Liu et al., "Unlocking giant negative thermal expansion through reversible conformational changes in regenerated silk fibroin film", Chemical Engineering Journal, Jan. 28, 2024, pp. 1-9, vol. 482.

"International Search Report (Form PCT/ISA/210) of PCT/CN2023/104855," mailed on Feb. 5, 2024, with English translation thereof, pp. 1-5.

"Written Opinion of the International Searching Authority (Form PCT/ISA/237) of PCT/ CN2023/104855," mailed on Feb. 5, 2024, pp. 1-3.

\* cited by examiner

SILK FIBROIN-BASED MULTI-RESPONSIVE SOFT ACTUATOR, MANUFACTURING METHOD AND REGULATION AND CONTROL METHOD

CROSS-REFERENCE TO RELATED APPLICATION

This is a continuation of International PCT application serial no. PCT/CN2023/104855, filed on Jun. 30, 2023, which claims the priority benefits of China Application No. 202310501676.8, filed on May 6, 2023. The entirety of each of the above-mentioned patent applications is hereby incorporated by reference herein and made a part of this specification.

BACKGROUND

Technical Field

The present invention relates to the design and manufacturing of a soft actuator, specifically relating to a silk fibroin-based multi-responsive soft actuator and a manufacturing method.

Description of Related Art

Soft actuators capable of converting external stimuli into mechanical motion hold immense potential in numerous cutting-edge applications, including but not limited to soft robotics, artificial muscles, biomimetic locomotion, and object manipulation. A wide array of soft actuators driven by diverse stimuli, such as light, electricity, magnetism, heat, humidity, and others, have been extensively documented in the literature. The development of high-performance soft actuators hinges critically on the formulation of stimulus-responsive materials. The creation of efficient stimulus-responsive materials necessitates the following characteristics: reversible large-scale deformation capabilities, high output power density, and sensitive responsiveness to tiny energy inputs. At present, this remains a significant challenge, requiring targeted design of material structures based on intrinsic mechanisms.

Biological materials, by virtue of their adjustable multi-layered assembly structures, provide abundant sites for extensive programmable deformation, thus conferring significant advantages in the construction of high-performance soft actuators. A notable example is the supercontractility of spider silk when subjected to high humidity stimuli. This characteristic has inspired the design of stimulus-responsive materials and soft actuators. However, the aforementioned contractility is irreversible, and fibrous materials face considerable limitations in some application scenarios. The development of efficient two-dimensional thin-film stimulus-responsive materials and soft actuators with reversible deformation capabilities, based on biomimetic principles, holds greater significance for practical applications. This aspect, however, has been largely overlooked.

SUMMARY OF THE DISCLOSURE

In order to solve the problems existing in the background technology, the purpose of the present invention is to provide a silk fibroin-based multi-responsive soft actuator and a manufacturing method.

The purpose of the present invention is realized through the following technical solution:

I. A Silk Fibroin-Based Multi-Responsive Soft Actuator:

The soft actuator includes a silk fibroin membrane and a flexible substrate, wherein the silk fibroin membrane is placed on the flexible substrate and tightly bonded thereto to constitute a double-layer membrane structure.

The thermal expansion coefficients of the silk fibroin membrane and flexible substrate are significantly different.

The thermal expansion coefficient of the silk fibroin membrane is negative, and there is a significant difference between the thermal expansion coefficient of the silk fibroin membrane and the thermal expansion coefficient of the flexible substrate.

The difference may enable the actuator to work, but the greater the difference, the larger the deformation amplitude of the actuator. In the examples listed in the present invention, the actual material system used has a thermal expansion coefficient of $-800$ to $-1200$ ppm$-1$ for the silk fibroin membrane, and a thermal expansion coefficient of 40 to 200 ppm$-1$ for the flexible substrate, i.e., the difference in thermal expansion coefficients is above 800 ppm$-1$.

II. A Method for Manufacturing a Multi-Responsive Soft Actuator:

The soft actuator is manufactured by the following method:

The flexible substrate is treated with plasma, followed by coating a wet silk fibroin membrane on the flexible substrate, which is then dried to obtain a silk fibroin membrane, and constitutes a double-layer membrane with the flexible substrate;

The double-layer membrane is placed in water and soaked for 0.1 to 20 minutes and then dried;

After drying the double-layer membrane, the silk fibroin membrane is entirely or partially soaked in a 0.5 to 3 wt % calcium chloride aqueous solution for a period of 0.1 to 20 minutes, then taken out and dried again to obtain the soft actuator.

The wet silk fibroin membrane contains silk fibroin and formic acid.

Furthermore, the wet silk fibroin membrane of the present invention further contains calcium chloride.

The wet silk fibroin membrane is prepared by dissolving 1.3 g of degummed silk in 3 to 5 wt % calcium chloride-formic acid solution, then placing it in an ultrasonic cleaner to oscillate to obtain a silk fibroin solution, and finally coating the silk fibroin solution on a flexible substrate to form the membrane.

Furthermore, the wet silk fibroin membrane of the present invention further contains photothermal conversion material.

Specifically, the calcium chloride-formic acid solution contains a photothermal conversion dye, with the dye adopted as Rhodamine B but not limited thereto.

Furthermore, the soft actuator of the present invention has a heating electrode on the silk fibroin membrane or flexible substrate to generate electric heating-driven actuation.

Further, the material of the flexible substrate of the present invention is PET, PI or PE.

Furthermore, the thickness of the wet silk fibroin membrane of the present invention ranges from 0.1 to 200 μm.

Furthermore, the thickness of the flexible substrate of the present invention ranges from 10 to 100 μm.

III. Regulation and Control Method for Multi-Responsive Soft Actuator:

The soft actuator is heated, causing the silk fibroin membrane and flexible substrate to undergo different thermal deformations, making the double-layer membrane structure bend and deform towards a side where the silk fibroin membrane is located.

By adjusting whether the silk fibroin membrane in the double-layer membrane after drying is soaked in calcium chloride aqueous solution or the concentration of the calcium chloride aqueous solution in which the silk fibroin membrane is soaked during the manufacturing process, it is possible to regulate and control the deformation angle, amplitude and morphology of the multi-responsive soft actuator.

Compared with the existing technology, the advantageous effects of the present invention are:
(1) The silk fibroin membrane has a significant negative thermal expansion property, so the silk fibroin membrane contracts when temperature rises, causing the actuator to bend towards a side of the silk fibroin membrane, resulting in a larger deformation angle;
(2) The deformation mechanism of the soft actuator is the reversible change of molecular chain conformation in the amorphous region, which does not involve the conversion between crystal types and secondary structures. The deformation mechanism may be driven by tiny energy input, has low energy consumption, and possesses better reversibility;
(3) The deformation ability of the soft actuator may be regulated through the concentration of calcium chloride, realizing reprogrammable deformation in different regions;
(4) The soft actuator possesses multi-stimuli responsiveness and may be driven by light, electricity, heat, and humidity fields.

In the figures, 1—silk fibroin membrane, 2—flexible substrate, 3—heating electrode.

DESCRIPTION OF EMBODIMENTS

The following is a further detailed description of the present invention in combination with the accompanying drawings and specific embodiments.

An embodiment of the present invention is as follows:

Example 1

A calcium chloride-formic acid solution with a concentration of 3 wt % is prepared. 1.3 g of degummed silk is dissolved in 6.8 ml of the above solution, and placed in an ultrasonic cleaner and oscillated for 1 hour to obtain the silk fibroin solution.

Figure 1:
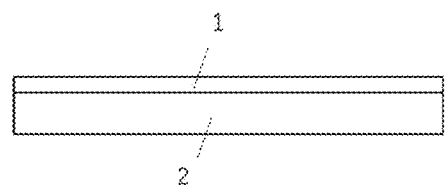
FIG. 1 is a schematic diagram of the structure of a soft actuator with a double-layer membrane structure.

A clean PI with a thickness of 30 µm is adopted as the flexible substrate 2, and subjected to plasma treatment for 2 minutes. A four-sided preparation device with a thickness of 200 µm is adopted to scrap-coat the wet silk fibroin membrane. After drying, a double-layer membrane including the silk fibroin membrane 1 and the flexible substrate 2 is obtained, as shown in FIG. 1. The double-layer membrane is respectively treated by not being soaked, entirely soaked in 1 wt % calcium chloride aqueous solution for 1 minute and blown dry with nitrogen, entirely soaked in 2 wt % calcium chloride aqueous solution for 1 minute and blown dry with nitrogen, and entirely soaked in 3 wt % calcium chloride aqueous solution for 1 minute and blown dry with nitrogen, thereby obtaining soft actuators with different deformation abilities.

Figure 2:
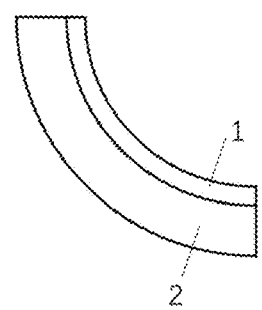
FIG. 2 shows the deformation state of the soft actuator of the present invention.
Figure 3:
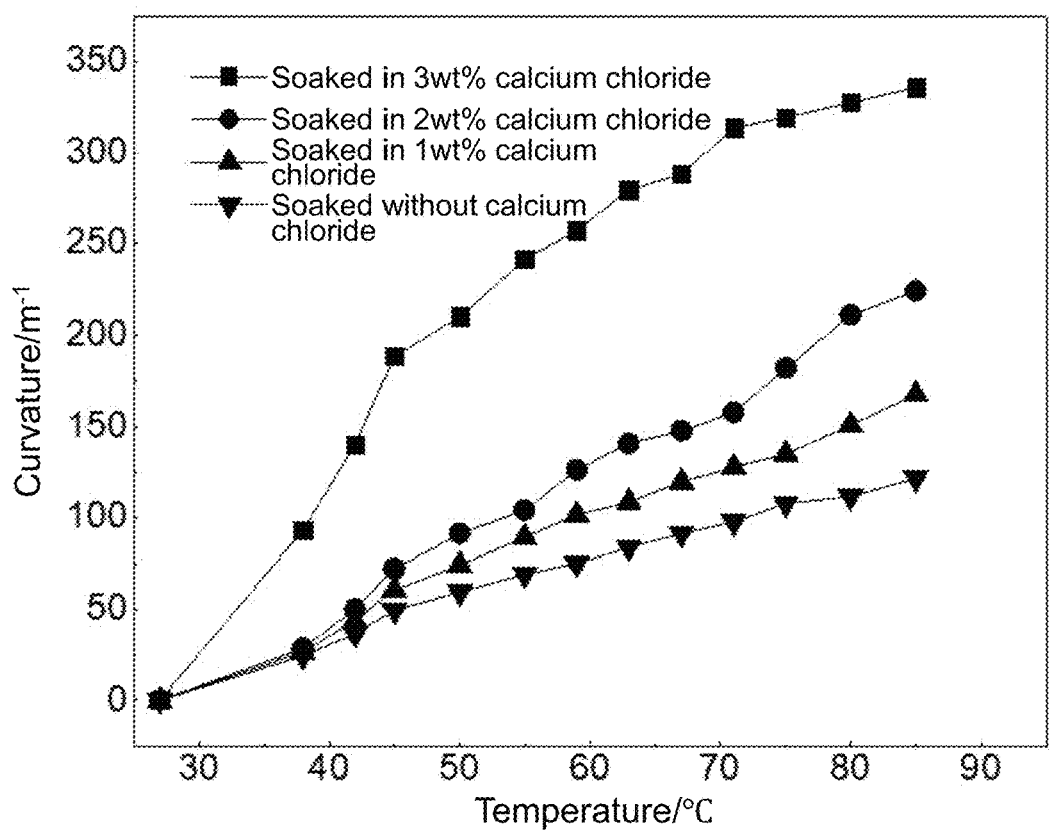
FIG. 3 shows the deformation curvature of soft actuators obtained by soaking in aqueous solutions of calcium chloride with different concentrations at various temperatures.

When the actuator operates, the overall soft actuator is placed on a 100° C. hot plate. Since the thermal expansion coefficient of the silk fibroin membrane 1 is negative, the silk fibroin membrane 1 undergoes thermal contraction when temperature rises, while the thermal expansion coefficient of the PI flexible substrate 2 is positive, causing thermal expansion when temperature rises. This leads to the bending of the double-layer membrane structure of the soft actuator towards a side of the silk fibroin membrane 1, as shown in FIG. 2. After turning off the hot plate, the temperature of the actuator slowly decreases and returns to its initial morphology. The bending curvature may be regulated by the temperature of the hot plate, and the soft actuators obtained after soaking in calcium chloride aqueous solutions with different concentrations exhibit different bending curvatures, as shown in FIG. 3. The higher the concentration of the calcium chloride aqueous solution used for soaking, the greater the bending curvature of the soft actuator, indicating that the deformation ability of the silk fibroin-based soft actuator in the present invention may be effectively regulated through the concentration of calcium chloride.

Example 2

A calcium chloride-formic acid solution with a concentration of 4.8 wt % is prepared. 1.3 g of degummed silk is dissolved in 6.8 ml of the above solution, and placed in an ultrasonic cleaner and oscillated for 1 hour to obtain the silk fibroin solution.

Figure 4:
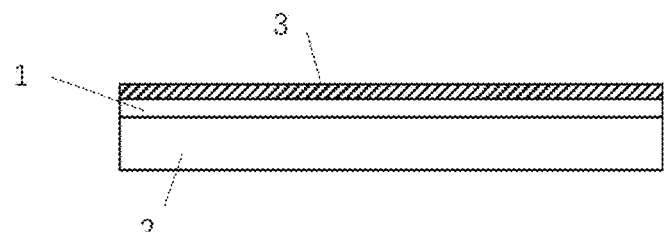
FIG. 4 is a schematic diagram of a soft actuator structure with a heating electrode on the flexible silk fibroin membrane.

A clean PET with a thickness of 50 µm may be adopted as the flexible substrate 2, and subjected to plasma treatment for 2 minutes. A four-sided preparation device with a thickness of 100 µm is used to scrap-coat the wet silk fibroin membrane. After drying, the thin membrane is washed in water for 5 minutes, and after drying, a double-layer membrane including the silk fibroin membrane 1 and the flexible substrate 2 is obtained, as shown in FIG. 1. The entire double-layer membrane is soaked in a 2 wt % calcium chloride aqueous solution for 1 minute, and then blown dry with nitrogen. Screen printing is utilized to print a silver heating electrode 3 on a side of the silk fibroin membrane 1 of the double-layer membrane, which is then cut to the required size to obtain the soft actuator, as shown in FIG. 4.

When the actuator is working, the heating electrode 3 is connected to a DC power supply. At a specific power, the heating electrode 3 generates Joule heat, causing the overall temperature of the soft actuator to rise. Since the thermal expansion coefficient of the silk fibroin membrane 1 is negative, the silk fibroin membrane 1 undergoes thermal contraction when temperature rises, while the PET flexible substrate 2 has a positive thermal expansion coefficient and undergoes thermal expansion when temperature rises. This leads to the double-layer membrane structure of the soft actuator bending towards a side of the silk fibroin membrane 1. The bending curvature may be regulated and controlled by the electrical power. After the power is turned off, the actuator returns to its initial morphology.

Example 3

A calcium chloride-formic acid solution with a concentration of 4.8 wt % is prepared. 1.3 g of degummed silk is dissolved in 6.8 ml of the above solution, and placed in an ultrasonic cleaner and oscillated for 1 hour to obtain the silk fibroin solution.

Figure 5:
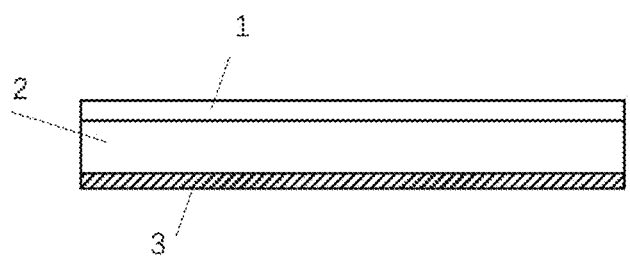
FIG. 5 is a schematic diagram of a soft actuator structure with a heating electrode on a flexible substrate.

A clean PE with a thickness of 100 μm may be adopted as the flexible substrate 2, and subjected to plasma treatment for 2 minutes. A four-sided preparation device with a thickness of 200 μm is used to scrap-coat the wet silk fibroin membrane. After drying, the thin membrane is washed in water for 5 minutes, and after drying, a double-layer membrane including the silk fibroin membrane 1 and the flexible substrate 2 is obtained, as shown in FIG. 1. Half of the double-layer membrane is soaked in a 2 wt % calcium chloride aqueous solution for 1 minute, and then blown dry with nitrogen. Screen printing is utilized to print a silver heating electrode 3 on a side of the flexible substrate 2 of the double-layer membrane, which is then cut to the required size to obtain the soft actuator, as shown in FIG. 5.

Figure 6:
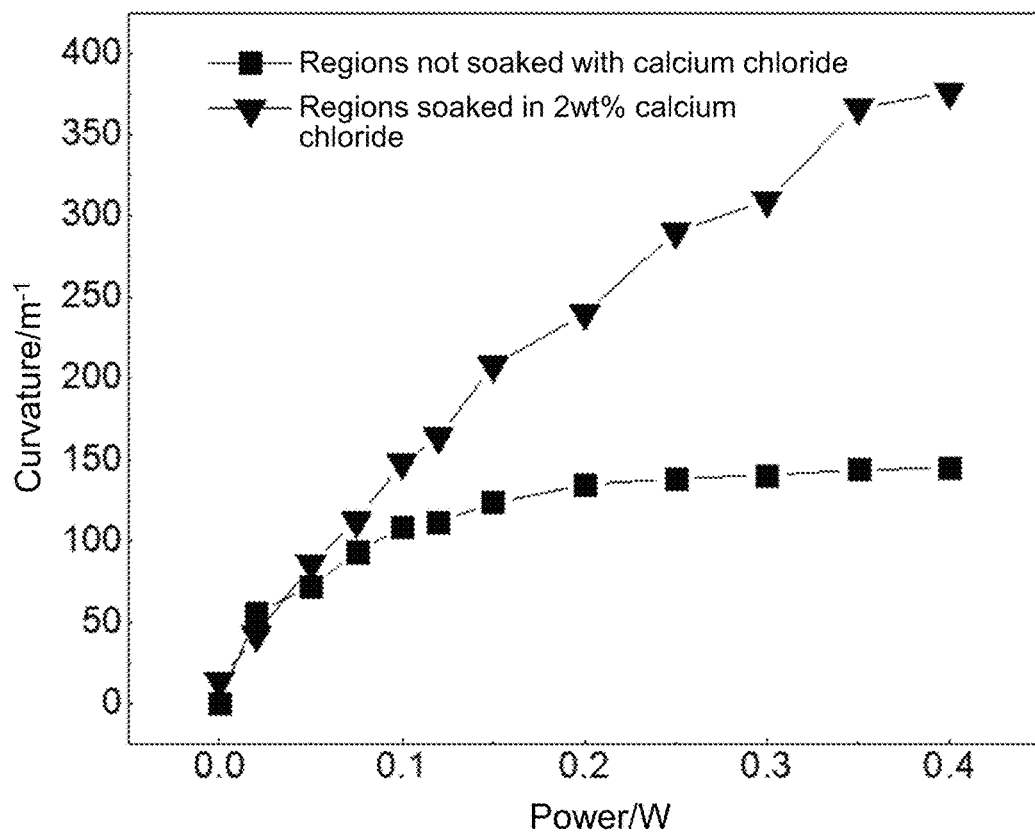
FIG. 6 shows a curvature diagram of deformation for different regions of the soft actuator under different electric heating powers.

When the actuator operates, the heating electrode 3 is connected to a DC power supply. At a specific power, the heating electrode 3 generates Joule heat, causing the overall temperature of the soft actuator to rise. Due to the negative thermal expansion coefficient of the silk fibroin membrane 1, the silk fibroin membrane 1 undergoes thermal contraction when temperature rises, while the PE flexible substrate 2 with a positive thermal expansion coefficient undergoes thermal expansion when temperature rises, resulting in the double-layer membrane structure of the soft actuator bending towards a side of the silk fibroin membrane 1. After turning off the power supply, the actuator returns to its initial morphology. Since silk fibroin membranes 1 with different calcium chloride contents possess different thermal expansion coefficients, the region soaked in 2 wt % calcium chloride solution exhibits a larger bending curvature than the region not soaked in calcium chloride solution. The bending curvature of different regions may be regulated and controlled by electrical power. As shown in FIG. 6, a bending curvature of 55 $m^{-1}$ may be generated at a heating power as low as 0.02 W. This result indicates that the soft actuator possesses very low energy consumption, and the deformation ability thereof may be adjusted through calcium chloride concentration, achieving programmable deformation in different regions.

Example 4

A calcium chloride-formic acid solution with a concentration of 3 wt % is prepared, and rhodamine B dye with a concentration of 100 mg/L is added thereto. 1.3 g of degummed silk is dissolved in 6.8 ml of the above solution, and placed in an ultrasonic cleaner and oscillated for 1 hour to obtain the silk fibroin solution containing photothermal conversion dye.

A clean PET with a thickness of 50 μm may be adopted as the flexible substrate 2, and subjected to plasma treatment for 2 minutes. A four-sided preparation device with a thickness of 100 μm is used to scrap-coat the wet silk fibroin membrane. After drying, a double-layer membrane including the silk fibroin membrane 1 and the flexible substrate 2 is obtained. The double-layer membrane sample is respectively treated by not being soaked, entirely soaked in 2 wt % calcium chloride aqueous solution for 1 minute and blown dry with nitrogen, half soaked in 2 wt % calcium chloride aqueous solution for 1 minute and blown dry with nitrogen, thereby obtaining soft actuators with different deformation abilities.

Figure 7:
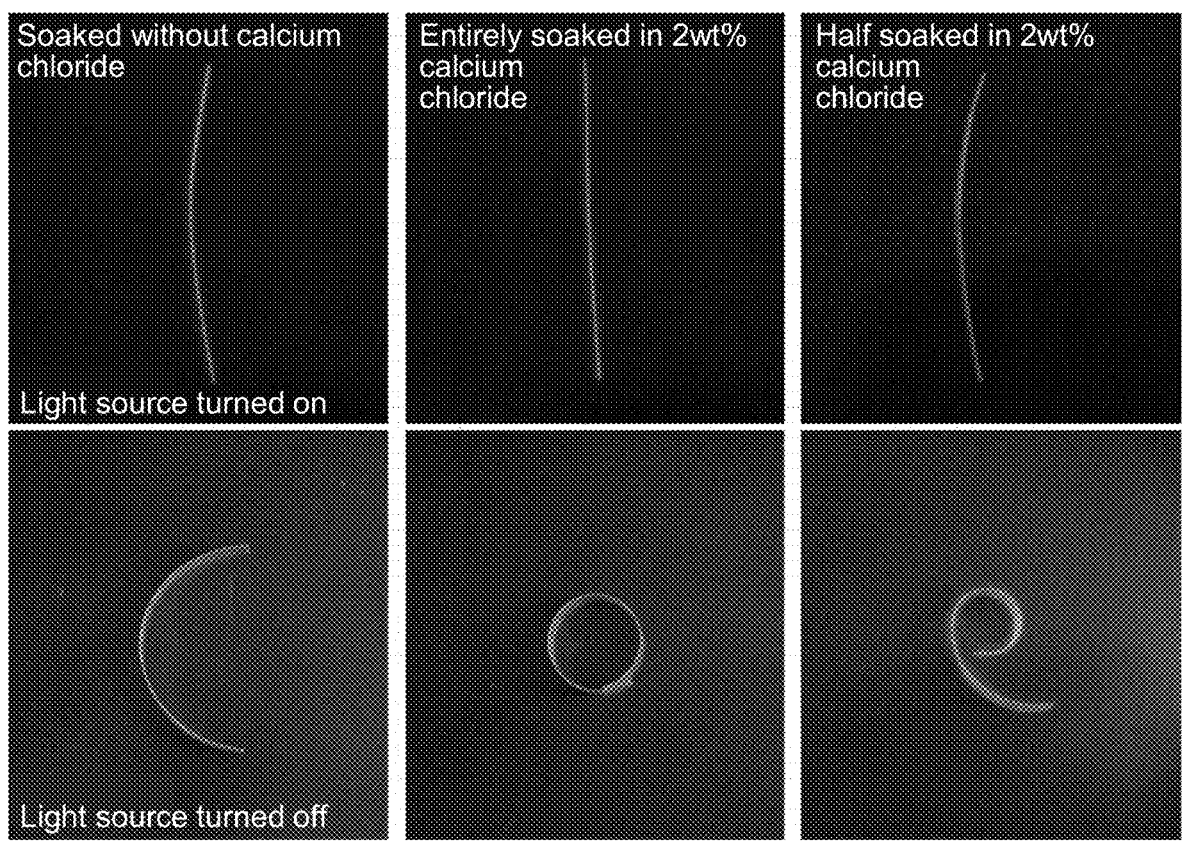
FIG. 7 shows the deformation diagram of the soft actuator under light stimulation.

When the actuator operates, an infrared lamp irradiates the soft actuator. Under the photothermal effect of Rhodamine B, the overall temperature of the soft actuator rises. Due to the negative thermal expansion coefficient of the silk fibroin membrane 1, the silk fibroin membrane 1 undergoes thermal contraction when temperature rises, while the PET flexible substrate 2 with a positive thermal expansion coefficient undergoes thermal expansion when temperature rises, causing the double-layer membrane structure of the soft actuator to bend towards a side of the silk fibroin membrane 1. After turning off the light source, the actuator slowly returns to its initial morphology. The actuator or actuator region soaked in 2 wt % calcium chloride solution exhibits a larger bending curvature than the sample or region not soaked in calcium chloride solution, as shown in FIG. 7. This result indicates that the deformation ability of the soft actuator may be regulated and controlled through calcium chloride concentration, and programmable deformation of different regions may be achieved.

Example 5

A calcium chloride-formic acid solution with a concentration of 3 wt % is prepared. 1.3 g of degummed silk is dissolved in 6.8 ml of the above solution, and placed in an ultrasonic cleaner and oscillated for 1 hour to obtain the silk fibroin solution.

A clean PET with a thickness of 30 μm may be adopted as the flexible substrate 2, and subjected to plasma treatment for 2 minutes. A four-sided preparation device with a thickness of 80 μm is used to scrap-coat the wet silk fibroin membrane. After drying, a soft actuator with a double-layer membrane structure including the silk fibroin membrane 1 and the flexible substrate 2 is obtained, as shown in FIG. 1.

When the actuator operates, the overall soft actuator is placed on a nylon mesh, with a water tank filled with water underneath the mesh, so that the soft actuator is in a high humidity environment. Due to the water absorption and swelling of the silk fibroin membrane 1, while the PET flexible substrate 2 absorbs almost no water, the double-layer membrane structure of the soft actuator bends towards a side of the flexible substrate 2. After moving away from the humidity source, the actuator returns to its initial morphology.

What is claimed is:

1. A regulation and control method applied to a silk fibroin-based multi-responsive soft actuator, wherein the soft actuator comprises a silk fibroin membrane and a flexible substrate, the silk fibroin membrane is placed on the flexible substrate and tightly bonded thereto to constitute a double-layer membrane structure, and thermal expansion coefficients of the silk fibroin membrane and the flexible substrate are different, and the regulation and control method comprises:

heating the soft actuator, causing the silk fibroin membrane and the flexible substrate to undergo different thermal deformations, making the double-layer membrane structure bend and deform towards a side where the silk fibroin membrane is located; and adjusting whether the silk fibroin membrane in the double-layer membrane after drying is soaked in a calcium chloride aqueous solution or a concentration of the calcium chloride aqueous solution in which the silk fibroin membrane is soaked during the manufacturing process, a deformation angle, an amplitude and a morphology of the multi-responsive soft actuator are regulated and controlled.

\* \* \* \* \*